US 6,669,261 B2

(12) United States Patent
Roberts et al.

(10) Patent No.: US 6,669,261 B2
(45) Date of Patent: Dec. 30, 2003

(54) STOWABLE REAR VEHICLE SEATS

(75) Inventors: Paul Roberts, Livonia, MI (US);
Daniel Mark Adsit, Ann Arbor, MI (US); Kimberly Ann Steele, Dearborn, MI (US); Carlos Alberto Clemente, Troy, MI (US); Steven Albert Dubuc, Ann Arbor, MI (US); John Patrick Joyce, Solihull (GB); Walter Earl Sutherlin, Jr., Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 09/682,872

(22) Filed: Oct. 26, 2001

(65) Prior Publication Data

US 2003/0080577 A1 May 1, 2003

(51) Int. Cl.$^7$ .................................................. B60N 2/02
(52) U.S. Cl. ................................ 296/65.09; 296/65.01; 296/65.05; 296/65.11; 296/65.13; 297/335
(58) Field of Search ................................ 296/65.01, 67, 296/65.03, 65.05, 65.06, 65.09, 65.13, 65.16, 69, 65.11; 297/331, 335, 15

(56) References Cited

U.S. PATENT DOCUMENTS

| | | | |
|---|---|---|---|
| 1,668,213 A | | 5/1928 | Landine |
| 1,747,717 A | * | 2/1930 | Hummert ................. 248/240.4 |
| 3,059,964 A | * | 10/1962 | Hoppe et al. ............. 296/65.05 |
| 4,105,245 A | * | 8/1978 | Simons et al. ............ 296/65.09 |
| 4,527,828 A | * | 7/1985 | Groce et al. .................. 296/63 |
| 4,609,221 A | * | 9/1986 | Bottcher ................... 296/65.09 |
| 4,740,030 A | * | 4/1988 | Nordskog ..................... 297/14 |
| 4,955,973 A | * | 9/1990 | Provencher .............. 296/65.07 |
| 5,224,750 A | * | 7/1993 | Clark et al. .............. 296/65.06 |
| 5,489,141 A | | 2/1996 | Strausbaugh et al. |
| 5,492,389 A | * | 2/1996 | McClintock et al. ......... 297/14 |
| 5,707,103 A | * | 1/1998 | Balk .......................... 297/331 |
| 5,868,451 A | * | 2/1999 | Uno et al. ................ 296/65.05 |
| 5,979,964 A | * | 11/1999 | Ban et al. ................. 296/65.09 |
| 5,984,397 A | * | 11/1999 | Dawson et al. .......... 296/65.09 |
| 6,106,066 A | * | 8/2000 | Moffa et al. ............... 297/326 |
| 6,123,380 A | * | 9/2000 | Sturt et al. ............... 296/65.09 |
| 6,231,103 B1 | * | 5/2001 | Elson et al. ............. 296/65.06 |
| 6,460,929 B2 | * | 10/2002 | Kamida ................... 296/65.13 |

FOREIGN PATENT DOCUMENTS

JP          06234337 A  *  8/1994  .................. 297/335

* cited by examiner

Primary Examiner—Stephen T. Gordon
Assistant Examiner—Lori L Coletta
(74) Attorney, Agent, or Firm—Gigette M. Bejin

(57) ABSTRACT

A stowable vehicle seat for a vehicle includes a seat base that is slideably connected to the vehicle. The seat is moveable between a first position and a second position adjacent a storage area. The seat base has a seat back rotatably connected thereto that allows the seat back to rotate between a normally up position and a folded down position. The seat base also has a pivot hinge located on an underside thereof that allows the seat base to pivot when the seat is located in the second position from a flat position to an upright position such that the seat is at least partially disposed in a rear quarter panel of the vehicle.

20 Claims, 3 Drawing Sheets

STOWABLE REAR VEHICLE SEATS

BACKGROUND OF INVENTION

The present invention relates generally to the folding and stowing of vehicle seats, and more particularly to the folding and stowing of vehicle seats in the rear quarter panels of the vehicle.

It is a known objective of all vehicle manufacturers to maximize the available storage area within the vehicle without significantly increasing its size. This is particularly true for vans, mini-vans, and sport utility vehicles. Increasing the size of the vehicle can be disadvantageous in that it can increase its cost as well as its weight and thereby decrease its fuel efficiency. It is also a known objective of these manufacturers to provide vehicles, such as vans, mini-vans, and sport utility vehicles that have increased seating capacity. A delicate balance must therefore be struck between increasing the storage capability of a vehicle and increasing the seating capacity of the vehicle.

One solution for trying to strike a balance between these competing objectives is the provision of removable seats. For example, in some prior mini-vans and vans, the rear seats can be removed individually or together to increase the storage capacity of the vehicle. The rear seats can then be placed back into the vehicle to increase its seating capacity as needed. However, these removable rear seats are typically heavy and bulky and often require more than one person to remove the seats from and then replace the seats into the vehicle. Additionally, the latch mechanisms for holding and locating these removable vehicle seats in their secure location can be cumbersome and difficult, which makes the removal and replacement processes more difficult and time consuming.

Another solution for trying to strike a balance between these competing objectives is by providing folding seats. Some current vehicles, including some sport utility vehicles, have configured the rear seats to fold downward to increase the storage area without having to remove the seats from the vehicle. However, the seats do not typically lie flush with the floor. Additionally, seats that can both fold and pivot are also known. While this arrangement is more desirable, the vehicle seats are still present in the storage area thereby reducing the available storage area.

It is also known that some supercab trucks have sideways facing jump seats with a seat base that can be folded up against the sidewalls of the truck cab. However, the seats still intrude on the storage area of the vehicle. Thus, none of these prior solutions have maximized both the seating and storage area of the vehicle.

SUMMARY OF INVENTION

It is therefore an advantage of the present invention to provide a vehicle seat that can be stowed to provide increased storage capacity in the floor of the vehicle without removal of the seat from the vehicle.

It is a further advantage of the present invention to provide a vehicle seat that can be stowed in a rear quarter panel of the vehicle to increase the storage capacity of the vehicle.

It is still another advantage of the present invention to provide a flat load floor for a vehicle that does not require removal of a vehicle seat.

In accordance with the above and other advantages of the present invention, a stowable vehicle seat is provided. The vehicle seat has a seat base that is slideably connected to the vehicle. The seat is moveable between a first position and a second position. In the first position, the seat is secured in the vehicle and is intended to receive a passenger therein. In the second position, the seat is located rearward in the vehicle adjacent a storage compartment. The seat base has a seat back rotatably connected thereto that allows the seat back to rotate between a normally up position and a folded down position. The seat base also has a pivot hinge located on an underside thereof that allows the seat base to pivot when the seat is located in the second position from a flat position to a side position such that the seat is at least partially disposed in a rear quarter panel of the vehicle.

These and other advantages, features and objects of the invention will become apparent from the drawings, detailed description and claims which follow.

DETAILED DESCRIPTION

Referring now to the figures, a seat system is disclosed. The preferred seat system is described in connection with an automotive vehicle, which is generally indicated by reference number 10. It will be understood that while the present invention is intended for use in an automotive vehicle, it could be used in a variety of other applications where maximizing both seating and storage capabilities is desirable. As shown, the vehicle 10 has a plurality of seats divided into rows, including a front row having a driver seat and a passenger seat, a middle row and a rear row. The present invention is preferably applied to the rear row. The rows are preferably comprised of individual seats, but may also be bench seats.

Figure 1:
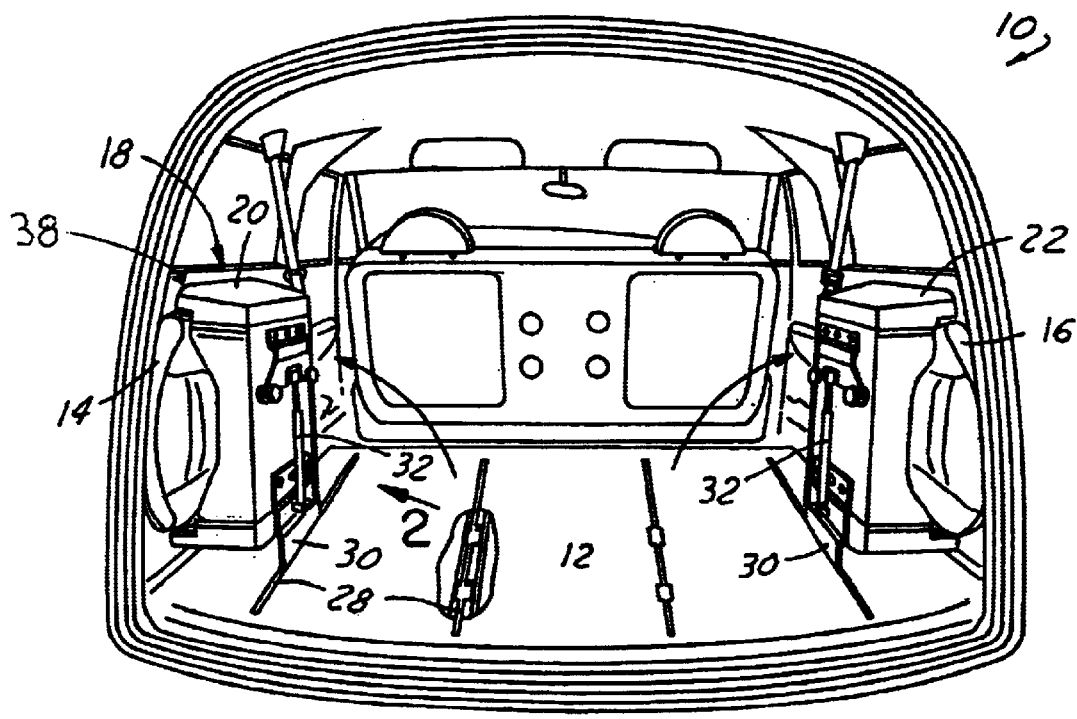
FIG. 1 is a schematic illustration of a vehicle incorporating a stowable rear seat in accordance with a preferred embodiment of the present invention.
Figure 2:
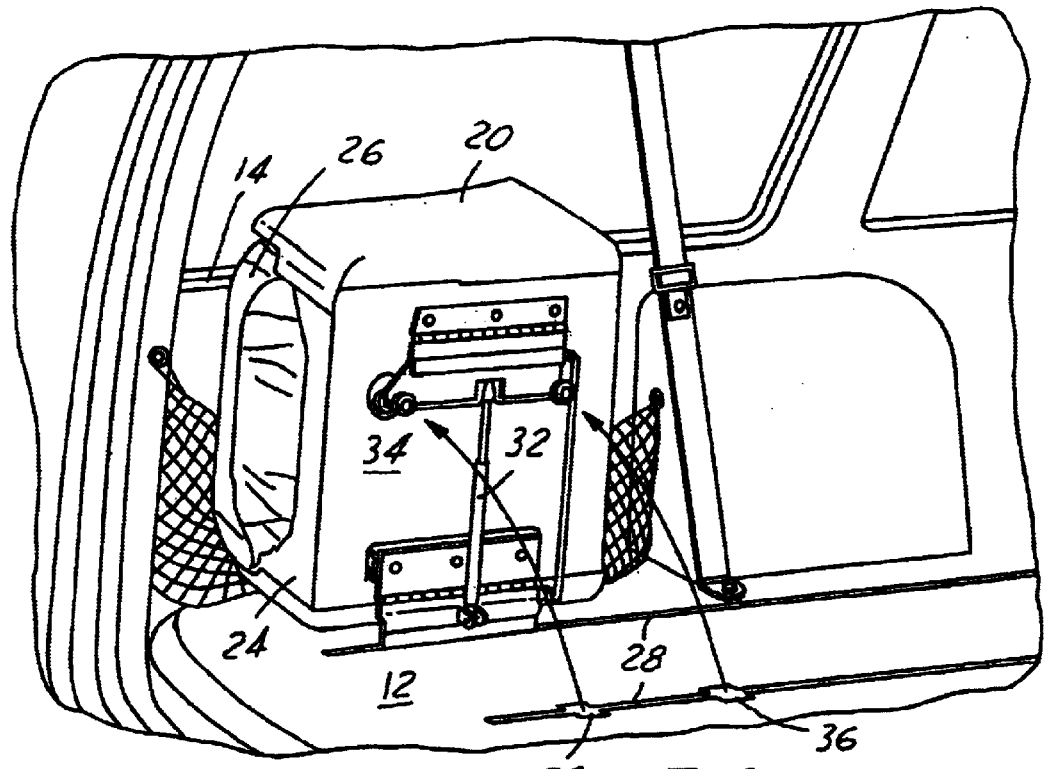
FIG. 2 is a schematic illustration of a rear seat being moved into a rear quarter panel of the vehicle in accordance with a preferred embodiment of the present invention.
Figure 3:
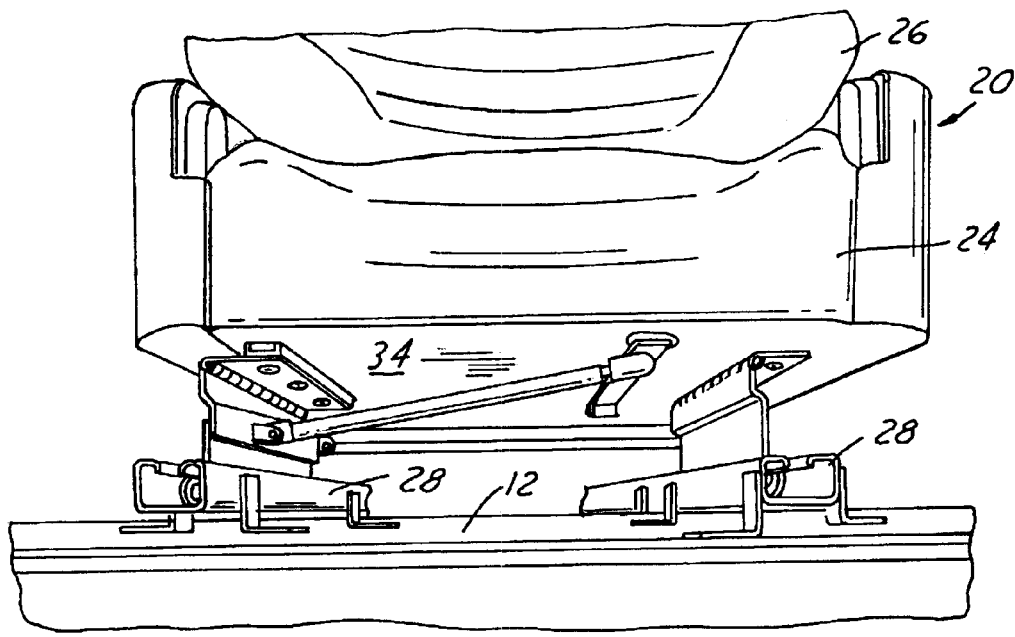
FIG. 3 is a schematic illustration of the underside of a stowable seat in a normally deployed position in accordance with a preferred embodiment of the present invention.
Figure 4:
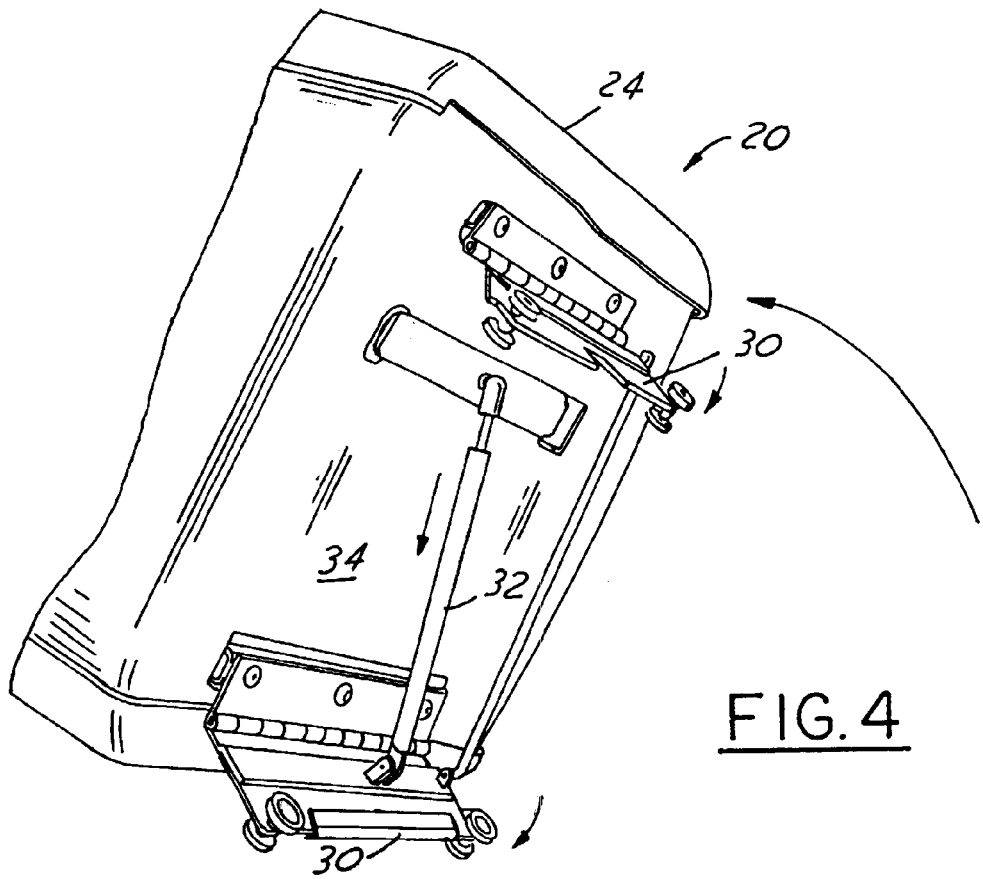
FIG. 4 is a schematic illustration of a seat being moved to a stored position in accordance with a preferred embodiment of the present invention.
Figure 5:
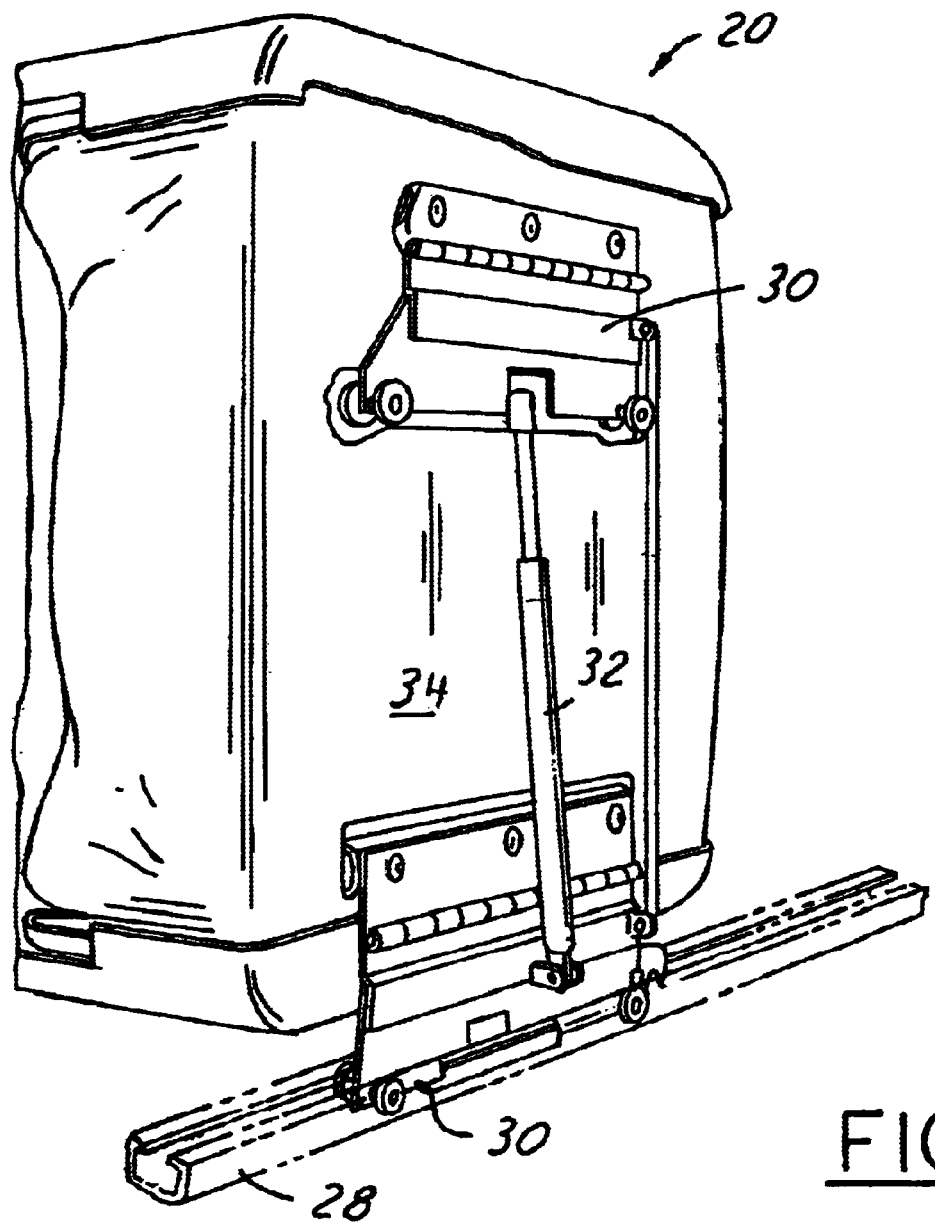
FIG. 5 is a schematic illustration of a seat in a stored position in accordance with a preferred embodiment of the present invention.

As shown in FIG. 1, the vehicle 10 also includes a floor portion 12, upon which the rows rest, and a pair of opposing quarter panels 14, 16. The present invention is preferably applied to a rear row. However, it should be understood that it can be applied to a variety of other rows as well. The description with respect to the rear row is merely illustrative and is not intended to be limiting. As shown, the rear row of seats 18 includes a left hand seat 20 and a right hand seat 22. The rear row of seats 18 is preferably for use in a vehicle such as a sport utility vehicle, a mini-van, or a van, but could be utilized in a variety of other vehicles as well. Additionally, the left hand seat 20 and the right hand seat 22 preferably move independently of one another, but it would be understood by one of skill in the art that they could move jointly. As shown, the left hand seat 20 and the right hand seat 22 are positioned on the load floor portion 12 of the vehicle 10.

The operation and configuration of the left hand seat 20 and the right hand seat 22 are the same except that they will pivot in opposite directions. The operation and configuration of the left hand seat 20 is described, but the description applies equally to the right hand seat 22 as will be understood by one of skill in the art. As shown in FIGS. 2 through 5, the left hand seat 20 has a seat base 24 and a seat back 26 coupled thereto. The seat back 26 is preferably rotatably coupled to the seat base 24 such that the seat back 26 can be rotated between a normally open position and a closed position. In the open position, the seat back 26 is positioned such that the seat 20 can accommodate a user. In the closed position, the seat back 26 is preferably folded down and lying on the seat base 20.

Additionally, the seat base 24 is preferably slideably connected to the load floor 12. Specifically, the load floor portion 12 has a pair of generally parallel rails 28 disposed thereon which engage flange members 30 which are secured to the underside of the seat base 24. The engagement of the seat base 24 to the pair of generally parallel rails 28 through the flange members 30 allows the seat 20 to slide between a first position when the seat is locked in place and a second position located rearward of the first position and adjacent a storage position. A lock (not shown) preferably maintains the seat 20 in the first position. However, a latch mechanism on the seat 20 or on the load floor portion 12 can be actuated to unlock the seat 20 and allow it to move to the second position where its movement is preferably arrested by a stop mechanism.

A pivot hinge 32 is preferably secured to the underside 34 of the seat base 24. The pivot hinge 32 normally retains the seat base 24 in contact with the pair of generally parallel rails 28. The pivot hinge 32 can be released from engagement with the innermost rail by a latch mechanism 36 that allows the seat 20 to pivot up on its side for storage. The seat 20 preferably pivots upward to a stored position when the seat back 24 is folded down into contact with the seat base 26. However, if the seat 20 is moved to the closed position by rotating the seat base 26 upward than unlatching the pivot hinge 32 will allow the seat 20 to rotate to the stored position. The rails 28 are preferably parallel, and run generally in a front to back direction. However, the rails 28 may be angled or otherwise configured in order to allow the seat 20 to be moved closer to the storage area.

In operation, the seat 20 is preferably folded from the normally open position to the closed position by rotating the seat back 26 from its upright position to the closed second deployed position. Alternatively, it will be understood that the seat base 26 may be rotated from an open position generally parallel to the load floor portion 12 to an upright position lying generally parallel to the seat back 24, such that the seat 20 is in the closed position. Once the seat is in the closed position, the seat base 26 can be unlatched and slid along the generally parallel pair of rails 28 from the first position to the second position. Once the seat 20 has been slid to the second position, the pivot hinge 32 can be actuated releasing the seat 20 from contact with the innermost rail. The seat 20, including the seat base 24 and the seat back 26, can then be pivoted about the pivot hinge 32 located on the seat base underside 34 such that the seat pivots into the storage area which leaves the flat load floor portion fully available for storage. The storage area 28 is preferably the rear quarter panel. However, a variety of other locations may be utilized.

In order to store both seats 20, 22, the sequence of steps described above is performed on both seats 20, 22, such that the left hand seat 20 is stored in the left rear quarter panel and the right hand seat 22 is stored in the right rear quarter panel. Thereafter, when a user wants to return the seats 20, 22, to the normal seating position. The sequence of steps described above can be performed in reverse. Specifically, the seats can be pivoted out of the storage area about their respective pivot hinges 32 allowing the seat bases 24 to engage both of the parallel rails 28. The seats 20, 22 can then be slid to their first position and locked into place. Thereafter, the seat backs 26 can be rotated downward such that the seats 20, 22 are in their normally open position.

While the present invention has been particularly set forth in terms of specific embodiment thereof, it will be understood in view of the instant disclosure that numerous variations on the invention are now enabled to those skilled in the art which variations yet reside within the present teachings. Accordingly, the invention is to be broadly construed and limited only by the scope and spirit of the claims now appended hereto.

What is claimed is:

1. A stowable seat for a vehicle, comprising:
    a seat base that is slideably connected to the vehicle and moveable between a forward position and a rearward position;
    a seat back rotatably connected to said seat base;
    a pivot hinge located on an underside of said seat base that allows said seat base to pivot from a first position to a second position wherein in said second position, the seat is at least partially disposed in a storage area of the vehicle wherein said storage area is located substantially above a floor portion of the vehicle.

2. The seat of claim 1, wherein said seat base is in communication with a pair of rails to slide from said forward position to said rearward position.

3. The seat of claim 2, wherein said pivot hinge allows said seat base to engages each of said pair of rails, but is removably engageable with an inner rail of said pair of rails.

4. The seat of claim 1, wherein said storage area is a rear quarter panel of the vehicle.

5. The seat of claim 1, wherein said seat back is moveable between a first position allowing an user to sit in the seat and a second position folded downward with respect to said seat base.

6. The seat of claim 1, wherein the seat is fully stored in said storage area leaving a flat load floor fully available for storage.

7. A seat for a vehicle, having a generally flat load floor position and at least one rear quarter panel, comprising:
    a seat base that is positioned above and slideable with respect to the generally flat load floor position;
    a seat back rotatably connected to said seat base;
    said seat base and seat back being moveable between a first position and a second position;
    a pivot hinge secured to the seat and connecting the seat to the vehicle, whereby said seat can pivot to a stored position at least partially disposed in the rear quarter panel.

8. The seat of claim 7, wherein the seat is fully disposed in the rear quarter panel.

9. The seat of claim 7, further comprising:
    a pair of rails located adjacent the generally flat load floor portion that allow the seat to slide therealong between a forward position and a rearward position.

10. The seat of claim 9, wherein said pivot hinge is attached to an underside of said seat base, and allows said seat base to engages each of said pair of rails.

11. The seat of claim 10, wherein said pivot hinge is releasably attached to an innermost rail of said pair of rails to allow the seat to pivot to said stored position.

12. The seat of claim 7, wherein said seat back is moveable with respect to said seat base to move the seat from an open position to a folded position.

13. The seat of claim 7, wherein said seat base is moveable with respect to said seat back to move the seat from an open position to a folded position.

14. The seat of claim 12, wherein the seat pivots about an x-axis defined by a line generally parallel to the rear quarter panel to move to said stored position.

15. The seat of claim 13, wherein the seat pivots about a y-axis defined by a line generally perpendicular to the rear quarter panel to move to said position.

16. A method for storing a vehicle seat without requiring its removal from the vehicle, comprising:

locating at least one seat on a flat load floor portion of a vehicle;

folding said at least one seat to a closed position from a normally open position;

sliding said at least one seat to a position adjacent a storage compartment; and pivoting said at least one seat to a position that is substantially perpendicular to said flat load floor portion and such that said at least one seat is at least partially disposed in said storage compartment.

17. The method of claim 16, wherein of folding comprises rotating a seat back downward with respect to a seat base.

18. The method of claim 16, wherein said storage compartment is a rear quarter panel of the vehicle.

19. The method of claim 16, wherein of pivoting includes rotating the seat about an x-axis defined by a line generally parallel to the rear quarter panel.

20. The method of claim 16, wherein of pivoting includes rotating the seat about a y-axis defined by a line generally perpendicular to the rear quarter panel.

* * * * *